(12) United States Patent
Shah et al.

(10) Patent No.: US 10,706,304 B2
(45) Date of Patent: Jul. 7, 2020

(54) USER AUTHENTICATION VIA A COMBINATION OF A FINGERPRINT AND A TACTILE PATTERN

(71) Applicant: Fortinet, Inc., Sunnyvale, CA (US)

(72) Inventors: Kushal Arvind Shah, Sunnyvale, CA (US); Peixue Li, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 98 days.

(21) Appl. No.: 15/719,354

(22) Filed: Sep. 28, 2017

(65) Prior Publication Data

US 2019/0095735 A1 Mar. 28, 2019

(51) Int. Cl.
| | | |
|---|---|---|
| G06K 9/00 | (2006.01) | |
| G06F 3/0488 | (2013.01) | |
| H04L 29/06 | (2006.01) | |
| H04W 12/06 | (2009.01) | |
| G06F 21/32 | (2013.01) | |
| G06F 21/36 | (2013.01) | |
| G06F 3/041 | (2006.01) | |

(52) U.S. Cl.
CPC ..... *G06K 9/00892* (2013.01); *G06F 3/04883* (2013.01); *G06F 21/32* (2013.01); *G06F 21/36* (2013.01); *G06K 9/00087* (2013.01); *G06K 9/00174* (2013.01); *H04L 63/0861* (2013.01); *H04W 12/06* (2013.01); *G06F 3/0412* (2013.01); *G06F 3/0414* (2013.01); *G06K 9/00053* (2013.01)

(58) Field of Classification Search
CPC .......... G06K 9/00892; G06K 9/00174; G06K 9/00087; G06K 9/00053; H04W 12/06; H04L 63/0861; G06F 3/04883; G06F 3/0412; G06F 3/0414

See application file for complete search history.

(56) References Cited

U.S. PATENT DOCUMENTS

| | | | |
|---|---|---|---|
| 8,504,842 B1* | 8/2013 | Meacham | G06F 3/0488 713/182 |
| 2002/0050713 A1* | 5/2002 | Bergenek | G06K 9/00013 283/68 |
| 2003/0202687 A1* | 10/2003 | Hamid | G06K 9/00046 382/124 |
| 2006/0239514 A1* | 10/2006 | Watanabe | G06K 9/00026 382/115 |
| 2013/0086671 A1* | 4/2013 | Tamaki | G06F 3/04883 726/16 |

(Continued)

*Primary Examiner* — Ming Y Hon
(74) *Attorney, Agent, or Firm* — Jaffery Watson Mendonsa & Hamilton LLP

(57) ABSTRACT

Systems and methods for authenticating a user by a combination of the user's fingerprint and a tactile pattern are provided. According to one embodiment, a computing device captures a tactile pattern that is drawn by a user's finger on a touch panel that is operationally connected to the computing device. The computing device captures one or more fingerprints of the user using a fingerprint reader component of the computing device at one or more locations on the touch panel while the user is drawing the tactile pattern. The computing device matches the captured tactile pattern and fingerprints with a stored tactile pattern and fingerprints and authenticates the user if both the captured tactile pattern and fingerprints match with the stored tactile pattern and fingerprints.

25 Claims, 11 Drawing Sheets

(56) References Cited

U.S. PATENT DOCUMENTS

| | | | |
|---|---|---|---|
| 2013/0127592 A1* | 5/2013 | Fyke | G06F 21/32 340/5.53 |
| 2014/0020058 A1* | 1/2014 | White | G06F 21/36 726/2 |
| 2014/0283022 A1* | 9/2014 | Beloncik | G06F 21/32 726/19 |
| 2015/0062005 A1* | 3/2015 | Rajendran | G06F 3/04883 345/156 |
| 2015/0089635 A1* | 3/2015 | Alpert | G06F 21/31 726/19 |
| 2016/0021081 A1* | 1/2016 | Caceres | H04L 63/08 726/7 |
| 2016/0026780 A1* | 1/2016 | Wu | G06F 21/32 382/124 |
| 2016/0050209 A1* | 2/2016 | Govande | H04L 63/101 726/7 |
| 2016/0065570 A1* | 3/2016 | Spencer, III | G06Q 20/40 726/7 |
| 2016/0140379 A1* | 5/2016 | Pedersen | G06K 9/00919 726/19 |
| 2016/0335428 A1* | 11/2016 | Hwang | G06F 21/36 |
| 2017/0083741 A1* | 3/2017 | Gao | G06K 9/00013 |
| 2017/0147865 A1* | 5/2017 | Jensen | G06K 9/00053 |
| 2018/0068101 A1* | 3/2018 | Kasilya Sudarsan | G06F 21/32 |
| 2018/0225435 A1* | 8/2018 | Blanch | G06F 21/32 |
| 2018/0299725 A1* | 10/2018 | Huang | G02F 1/133514 |
| 2019/0034611 A1* | 1/2019 | Bergsell | G06F 21/32 |

* cited by examiner

Fingerprint reading area
and pattern start point

USER AUTHENTICATION VIA A COMBINATION OF A FINGERPRINT AND A TACTILE PATTERN

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2017, Fortinet, Inc.

BACKGROUND

Field

Embodiments of the present invention generally relate to the field of user authentication techniques. In particular, various embodiments relate to authenticating a user by a combination of a user's fingerprint and a tactile pattern.

Description of the Related Art

With the increase in usage of mobile devices across the world, more and more sensitive information is stored and/or transmitted by mobile devices. There has also been an increase in the need for strong authentication mechanisms. The traditional method of user authentication is the use of passwords or Personal Identification Numbers (PINs), which when entered correctly, give anyone complete access to the device at issue. But today, these passwords and PINs can be cracked either by social engineering attacks, by brute force or by other mechanisms. Another current form of authentication is scanning users' fingerprints via fingerprint readers; however, it is possible for malicious entities to spoof current fingerprint recognition systems. For example, a pair of researchers at Michigan State University have shown that smartphone fingerprint readers can be fooled by converting high-quality fingerprint scans (e.g., harvested from a surface the user has touched or from a photo) into fake, 3-D fingerprints. See http://research.msu.edu/msus-jain-creates-spoof-finger-to-test-security/. Another method of authentication is tactile pattern recognition, but malicious entities can discover such patterns using a brute force attack to guess the pattern on touch-enabled devices in sufficient time. Meanwhile, it is not convenient for users if mobile devices require multiple authentication mechanisms before the devices are unlocked.

Thus, there arises a need for a strong multi-factor authentication mechanism, which would help protect these devices and their users against unauthorized usage while keeping the authentication process user friendly.

SUMMARY

Systems and methods are described for authenticating a user by a combination of the user's fingerprint and a tactile pattern. According to one embodiment, a computing device captures a tactile pattern that is drawn by a user's finger on a touch panel that is operationally connected to the computing device. The computing device captures one or more fingerprints of the user using the fingerprint reader component of the computing device at one or more locations on the touch panel while the user is drawing the tactile pattern. The computing device matches the captured tactile pattern and fingerprints with the stored tactile pattern and fingerprints and authenticates the user if the captured tactile pattern and fingerprints match with the stored tactile pattern and fingerprints.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
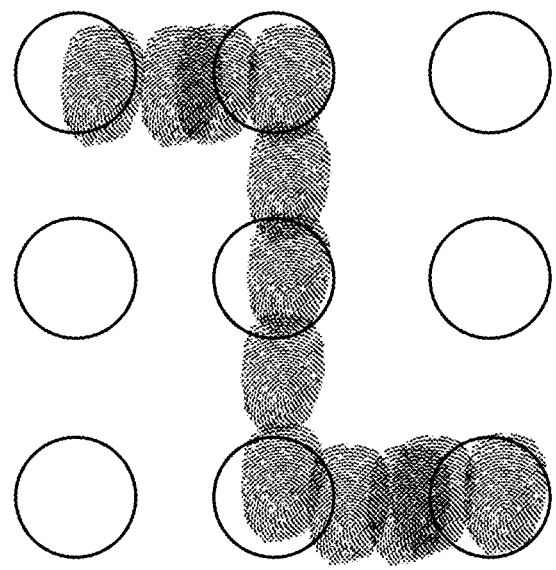
FIGS. 1-8 illustrate user interfaces for authenticating a user by capturing a user's fingerprints and tactile patterns in accordance with embodiments of the present invention.

Systems and methods are described for authenticating a user by a combination of the user's fingerprint and a tactile pattern. According to one embodiment, a computing device captures a tactile pattern that is drawn by a user's finger on a touch panel that is operationally connected to the computing device. The computing device captures one or more fingerprints of the user using the fingerprint reader component of the computing device at one or more locations on the touch panel while the user is drawing the tactile pattern. The computing device matches the captured tactile pattern and fingerprints with the stored tactile pattern and fingerprints and authenticates the user if the captured tactile pattern and fingerprints match with the stored tactile pattern and fingerprints.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates a user interface for authenticating a user by a computing device in accordance with a first embodiment of the present invention. In this example, the computing device comprises a touch screen having an integrated fingerprint reader. The touch screen is capable of detecting the touch and movement of a user's finger on the screen. When a user uses the computing device for the first time, the computing device may show a pattern screen with 9 fixed points and ask the user to define a continuous tactile pattern as a lock. The user may draw the continuous tactile pattern by moving his/her finger through some of the 9 points in a particular order that is only known to the user him/herself. Defining such a tactile pattern as an unlock mechanism is well known in the art. Therefore, further explanation is omitted for sake of brevity.

The fingerprint reader integrated with the touch screen may read fingerprints when the user's finger is touching the screen and drawing the tactile pattern. In this example, when the user begins drawing the pattern by touching a start point, which is the upper-left of the 9 fixed points, the user's fingerprint is scanned at the start point. When the user moves his/her finger from the start point to other points, the fingerprints of the user's finger are read at fixed points.

The tactile pattern drawn by the user and the fingerprints of the user read at the fixed points may be stored in a secure storage of the computing device. When the user wants to use the computing device, an unlock screen with the 9 fixed points is shown to the user. The user draws a tactile pattern on the unlock screen and fingerprints are read when the user's finger goes through the fixed points. The tactile pattern and the fingerprints captured at the unlock screen are compared with the stored tactile pattern and fingerprints. If the tactile pattern and fingerprints captured via the unlock screen match the stored tactile pattern and fingerprints, the user is authenticated and the computing device is unlocked for use.

Figure 2:
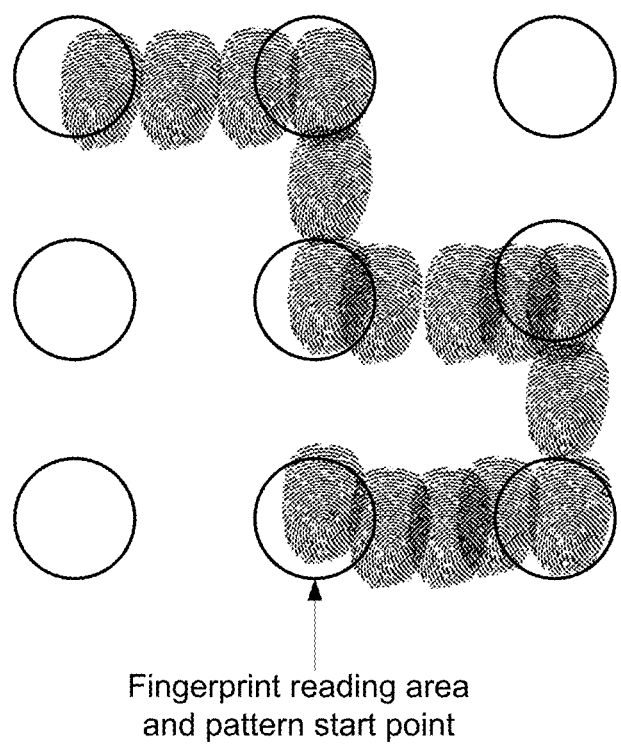

FIG. 2 illustrates a user interface for authenticating a user by a computing device in accordance with a second embodiment of the present invention. In this example, the fingerprint reader is capable of reading a fingerprint at only one fixed point of the touch screen, such as in the middle of bottom of the touch screen as shown in FIG. 2. A user must start drawing a continuous tactile pattern at the fingerprint reading point and the user's fingerprint is read when the user starts drawing the continuous tactile pattern.

Figure 3:
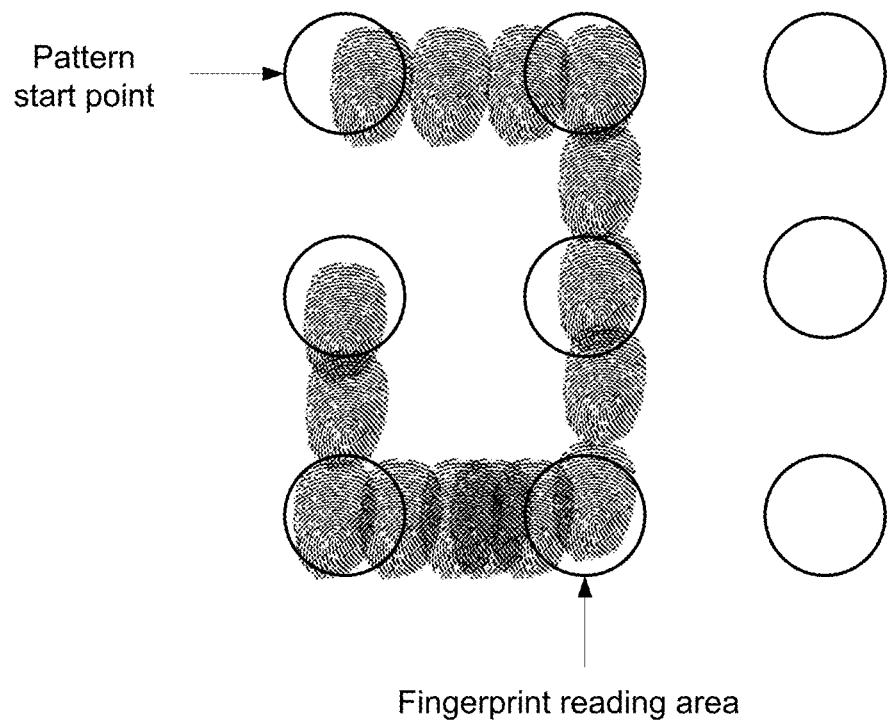

FIG. 3 illustrates a user interface for authenticating a user by a computing device in accordance with a third embodiment of the present invention. In this example, the fingerprint reader is capable of reading a fingerprint at only one fixed point of the touch screen, such as in the middle of the bottom of the touch screen. A user may start drawing a continuous tactile pattern at any point but must go through the designated fingerprint reading point at least once and the user's fingerprint is read when the finger goes through the designated fingerprint reading point.

Figure 4:
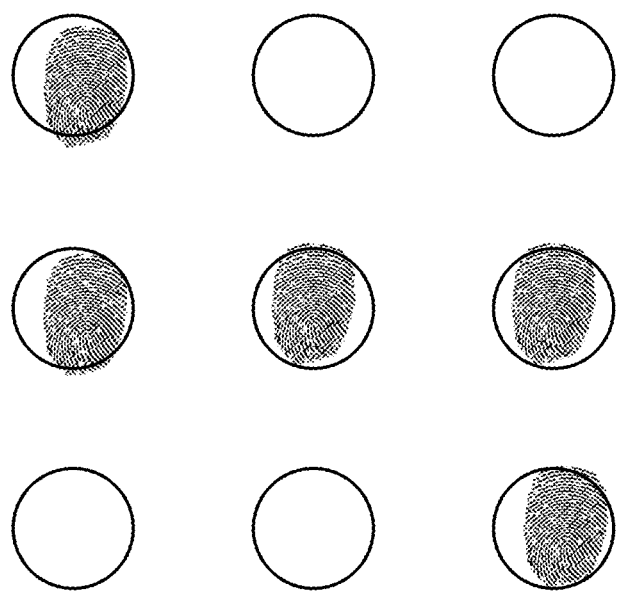

FIG. 4 illustrates a user interface for authenticating a user by a computing device in accordance with a fourth embodiment of the present invention. In this example, the tactile pattern is discontinuous. The user may touch some of the fixed points on the touch screen in a particular order or with a particular rhythm and fingerprints of the user's finger are read when the finger is touching the screen. The computing device is unlocked only when the tactile pattern or rhythm pattern as well as fingerprints read at the fixed points match the stored pattern and fingerprints.

Figure 5:
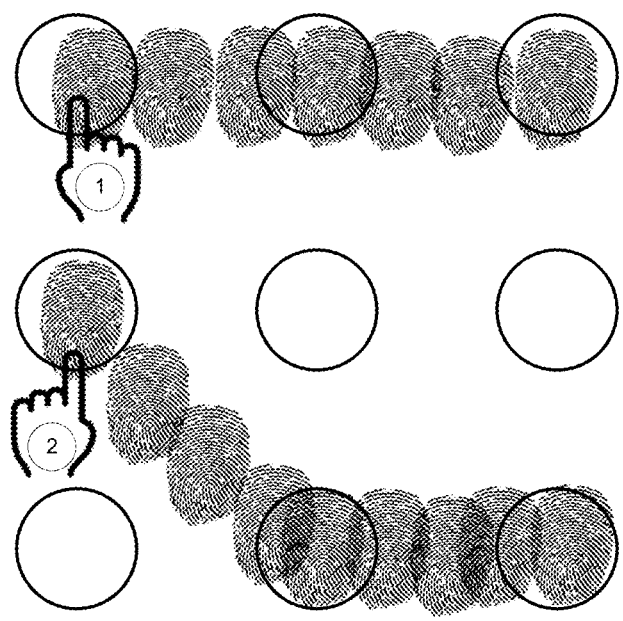

FIG. 5 illustrates a user interface for authenticating a user by a computing device in accordance with a fifth embodiment of the present invention. In this example, the tactile pattern comprises multiple continuous sub-patterns that may be drawn by different fingers of the user. For example, the user draws a first part of the pattern with a first finger and draws a second part of the pattern with a second finger. Fingerprints of the first and second fingers are captured when the fingers go through the designated fingerprint reading points. The computing device is unlocked only when the combined patterns and fingerprints of the first and second fingers match the stored patterns and fingerprints.

Figure 6:
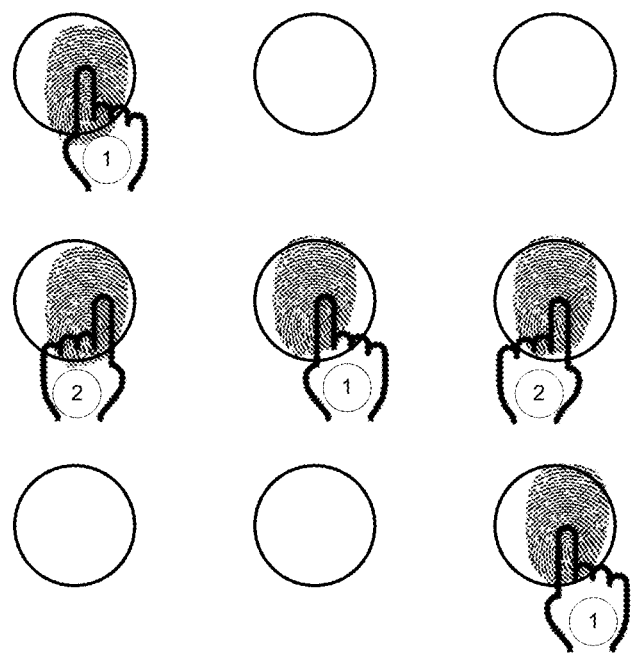

FIG. 6 illustrates a user interface for authenticating a user by a computing device in accordance with a sixth embodiment of the present invention. In this example, the tactile pattern is discontinuous. The user uses different fingers to touch some of the fixed points in a particular order. The tactile pattern and fingerprints of the different fingers are detected at these fixed points. The computing device is unlocked only when tactile pattern as well as fingerprints of the different fingers read at the fixed points match the stored pattern and fingerprints.

Figure 7:
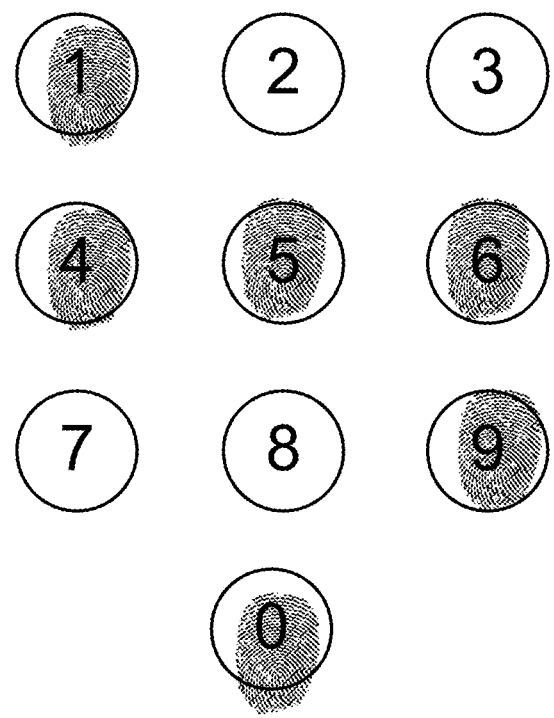

FIG. 7 illustrates a user interface for authenticating a user by a computing device in accordance with a seventh embodiment of the present invention. In this example, the computing device displays a virtual number pad on a touch screen. A user inputs a passcode through the virtual number pad and one or more fingerprints of the user are scanned when the user is touching the numbers shown on the touch pad. The user is authenticated when the passcode input by the user is correct and when the fingerprints captured during passcode input match the stored fingerprints.

Figure 8:
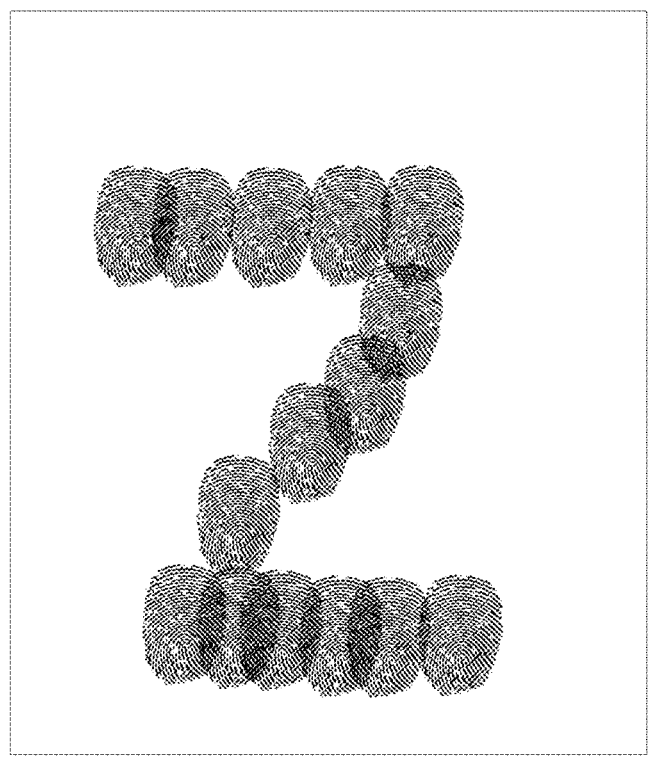

FIG. 8 illustrates a user interface for authenticating a user by a computing device in accordance with an eighth embodiment of the present invention. In this example, the fingerprint reader of the computing device may read fingerprints anywhere on the touch screen and there is no fixed point for defining a tactile pattern. The user can start drawing a continuous or discontinuous tactile pattern starting from any point on the screen. While the user is drawing the tactile pattern, one or more fingerprints of the user may be captured by the fingerprint reader. For example, the fingerprint reader may capture a fingerprint at the starting point when the user begins to draw the pattern. The computing device may capture the movement of user's finger on the touch screen and capture user's fingerprints at particular points of the pattern. For example, when a turning point of the movement is detected, the fingerprint reader may capture a fingerprint at the turning point. In other examples, the fingerprint reader may also capture fingerprints of the user periodically when the user is drawing the pattern. The tactile pattern and fingerprints captured along with the tactile pattern are then matched with a previously stored pattern and fingerprints to authenticate the user.

Those skilled in the art recognize there are various other ways to create tactile patterns. For example, the user may create one or more continuous or discontinuous patterns on a touch screen with two or more fingers simultaneously. Fingerprints of the fingers can be captured when the fingers touch the screen. The computing device is unlocked only when the combined captured pattern(s) and fingerprint(s) match the previously stored pattern(s) and fingerprint(s).

Figure 9:
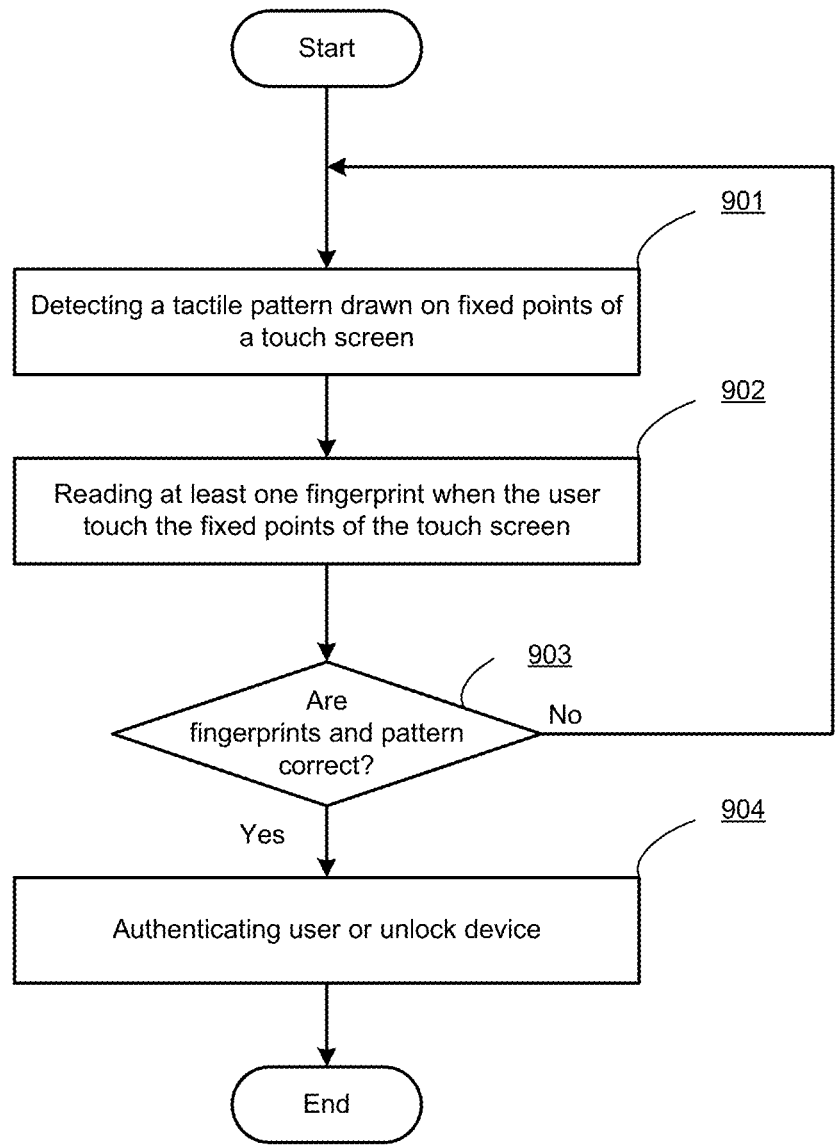
FIG. 9 is a flow diagram illustrating a method for authenticating a user by capturing the user's fingerprints and a tactile pattern in accordance with an embodiment of the present invention.

FIG. 9 is a flow diagram illustrating a method for authenticating a user by identifying the user's fingerprint and a tactile pattern in accordance with an embodiment of the present invention. In this example, a computing device (e.g., a desktop computer, a control panel, a smartphone, a tablet computer or other interactive device) may include a touch screen on which some fixed points are shown to a user and user's tactile pattern and fingerprints are captured at the fixed points.

At block 901, the computing device's pressure sensor detects a continuous or discontinuous tactile pattern that is drawn/made by a user on the fixed points of the touch screen. In one embodiment, the user may draw the pattern by going through some fixed points in an order that is known only to the user. In another embodiment, the user may tap some of the fixed points in a particular order or rhythm to generate the tactile pattern. Those skilled in the art will appreciate that the tactile pattern can be any combination of finger movements or tapping on the fixed points shown on the touch screen.

At block 902, a fingerprint reader of the computing device detects fingerprints of the user while the user is drawing the tactile pattern. If the fingerprint reader can scan the user's finger at only one fixed point on the touch screen, then the user's fingerprint is captured when the user's finger goes through or taps that point. If the fingerprint reader can detect fingerprints at any point on the touch screen, multiple fingerprints of the user's finger can be captured when the user's finger goes through or taps any of the fixed points. If the tactile pattern is drawn by different fingers of the user, that is the user may change his/her fingers while drawing the pattern, the fingerprint reader can capture the fingerprints of the different fingers. In one embodiment, the computing device may also record where the fingerprints are captured, such as, a first fingerprint is captured at fixed point 1 and another fingerprint is captured at fixed point 2.

At block 903, the captured tactile pattern and fingerprint(s) are matched with the tactile pattern and fingerprints stored in a secure memory of the computing device. In this example, the 9 fixed point shown in FIG. 1 may be represented by the numbers 1-9 and the tactile pattern may be represented by a series of numbers of the fixed points that the user's finger goes through on the touch screen. Thus, the tactile pattern shown in FIG. 1 may be represented as 1-2-5-8-9. In another example, the pattern may be represented by a combination of lines between the fixed points.

In this example, one or more fingerprints are captured at the fixed points and these fingerprint scans may be matched with stored fingerprint scans based on a set of one or more security rules. In one example, the computing device may comprise a less stringent security rule that authenticates a user with one matched fingerprint. In another example, the computing device may comprise a security rule that authenticates the user only when all the captured fingerprints match the stored fingerprints. In a further example, the computing device may comprise a stringent security rule that authenticates the user only when all the captured fingerprints and positions where the fingerprints are captured are matched with the stored fingerprints and positions.

At block 904, the user is authenticated and the computing device is unlocked.

Figure 10:
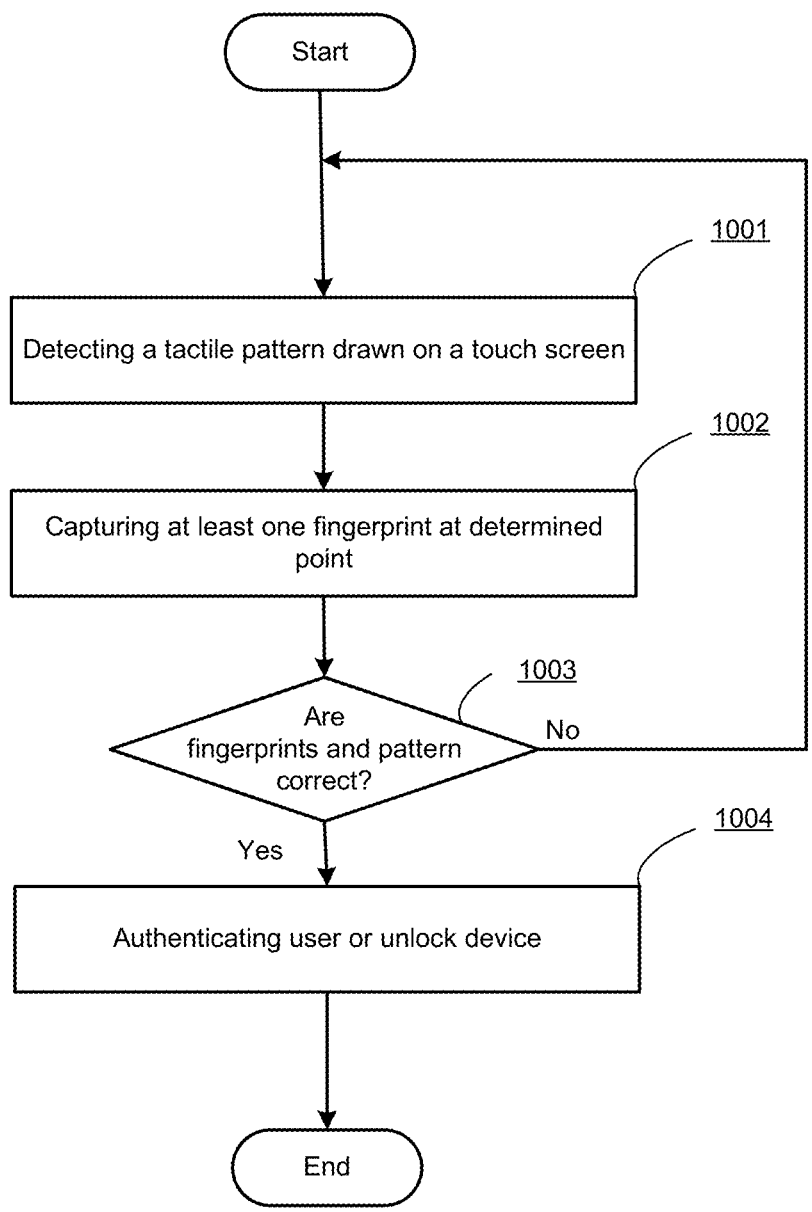
FIG. 10 is a flow diagram illustrating a method for authenticating a user by capturing the user's fingerprints and a tactile pattern in accordance with another embodiment of the present invention.

FIG. 10 is a flow diagram illustrating a method for authenticating a user by identifying the user's fingerprint and performing tactile pattern recognition in accordance with a second embodiment of the present invention. In this example, a computing device may comprise a touch screen on which the user's tactile pattern and fingerprints may be captured at any point on the screen.

At block 1001, a user may draw a tactile pattern by moving his/her finger(s) on the touch screen and the computing device's pressure sensor detects the tactile pattern by capturing the track of the movements.

At block 1002, the computing device captures one or more of the user's fingerprints as the user is drawing the pattern. In this example, because no fixed point is defined on the touch screen, the user can draw the tactile pattern at any point on the touch screen. Thus, the computing device may capture one or more fingerprints at one or more pre-defined points on the touch screen. For example, the computing device may capture a fingerprint at the start point of the pattern. When the user touches the screen and begins to draw the tactile pattern, the fingerprint reader of the computing device may capture a fingerprint of the user. The computing device may capture more fingerprints of the user at other points as the user is drawing the pattern. For example, if the pattern drawn by the user on the touch screen comprises polylines, the computing device may monitor the movements of the user's finger and detect turning point(s) (e.g. vertices) of the polylines. A fingerprint may be captured by the fingerprint reader at each of the turning points. In another example, the fingerprint reader may capture a fingerprint of the user periodically after the user begins to draw the pattern. For example, if the user takes one second to finish drawing a pattern and the fingerprint reader captures a fingerprint every 0.25 seconds, then 4 fingerprints may be captured when the user is drawing the pattern. The computing device may also record the locations where the fingerprints are captured on the screen.

At block 1003, the captured tactile pattern, fingerprint(s) and the locations where the fingerprints are captured are matched with those stored in a secure memory of the computing device. The rules for matching the tactile pattern and the fingerprints may be the same as those described with reference to FIG. 9 in relation to block 903.

At block 1004, the user is authenticated and the computing device is unlocked.

Figure 11:
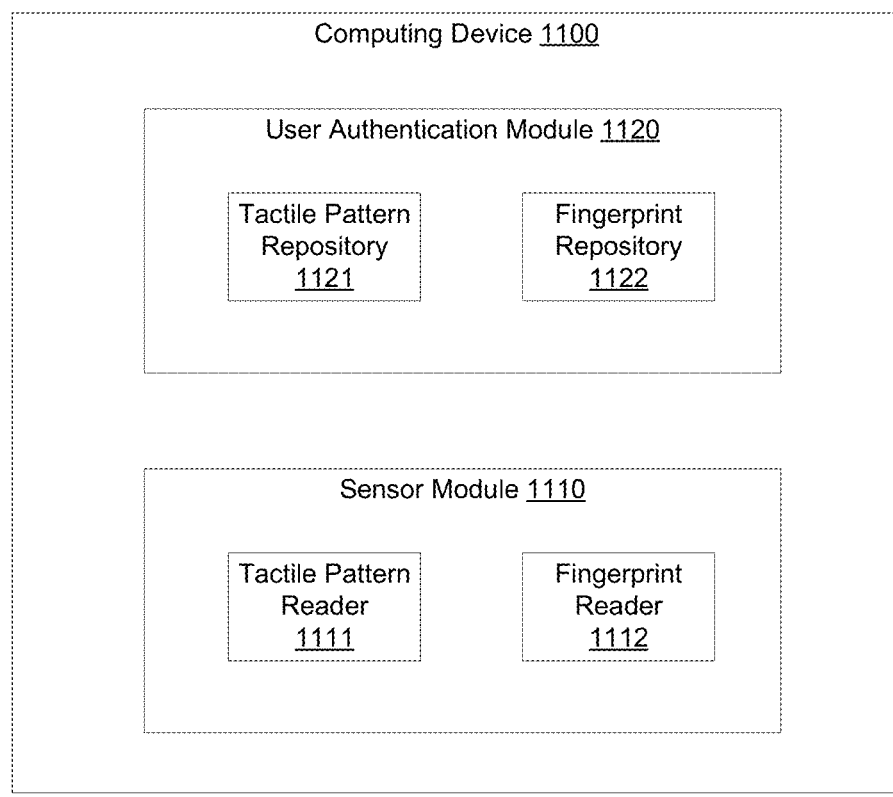
FIG. 11 illustrates exemplary functional units of a computing device in accordance with an embodiment of the present invention.

FIG. 11 illustrates exemplary functional units of a computing device 1100 in accordance with an embodiment of the present invention. In the context of the present example, computing device 1100 comprises a sensor module 1110 and a user authentication module 1120. Sensor module 1110 comprises a tactile pattern reader 1111 and a fingerprint reader 1112. Tactile pattern reader 1111 may comprise a pressure sensor that is capable of sensing the pressure of a user's finger on a screen and detecting the movements of the user's finger on the screen. The tactile pattern of the movements is recognized by tactile pattern reader 1111 as a secret of the user. Fingerprint reader 1112 is used for reading the user's fingerprints while the user is drawing a tactile pattern on the screen. In one embodiment, fingerprint reader 1112 is capable of capturing fingerprints at one or more fixed points on the screen and the user's fingerprints are captured when the user's finger goes through or taps the fixed points. In another embodiment, fingerprint reader 1112 is capable of capturing the user's fingerprint at any point on the screen. The user's fingerprints may be captured at pre-determined points on a tactile pattern, such as the start point and/or turning points of the pattern. Optionally, fingerprint reader 1112 may scan the user's fingerprints periodically when the user is drawing a tactile pattern on the screen.

User authentication module 1120 may comprise a tactile pattern repository 1121 and a fingerprint repository 1122. A user may draw a pattern that is known only to him/her by moving or tapping his/her finger on a touch screen and the pattern drawn by the user may be stored within tactile pattern repository 1121. Fingerprint repository 1122 is used for storing fingerprint(s) of the user. The fingerprint(s) may be captured by fingerprint reader 1112 when the user is drawing the pattern on the screen. In one embodiment, the locations on the screen where the fingerprints are captured are also stored in fingerprint repository 1122. Tactile pattern repository 1121 and fingerprint repository 1122 may be within a dedicated memory that is protected by encryption mechanisms and the access thereof may be limited to authentication module 1120. When a user tries to unlock computing device 1100, a tactile pattern and fingerprints are captured by sensor module 1110, user authentication module 1120 may match the captured tactile pattern with patterns stored in tactile pattern repository 1121 and the fingerprints captured with the fingerprints stored in the fingerprint repository 1122. If the captured pattern and fingerprint(s) of a user match the stored pattern and fingerprints, then the user is successfully authenticated and computing device 1100 may be unlocked. In one embodiment, the locations where the fingerprints are captured by fingerprint reader 1112 are also matched with stored locations. In one embodiment, the user is authenticated only when the locations of the captured fingerprints are also matched with those stored in fingerprint repository 1122. User authentication module 1120 may also comprise security rules indicating how to match the captured patterns and fingerprints.

Figure 12:
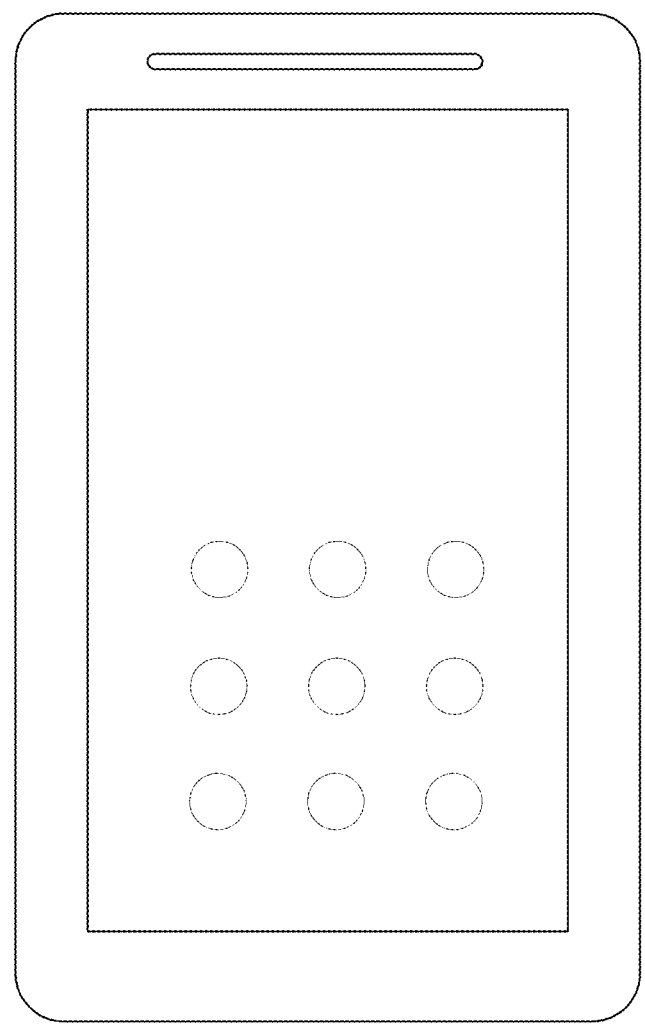
FIG. 12 illustrates a computing device with a touch screen integrated with a fingerprint reader in accordance with an embodiment of the present invention.

FIG. 12 illustrates a computing device with a touch screen integrated with a fingerprint reader in accordance with an embodiment of the present invention. In this example, a fingerprint reader is integrated with a touch screen of a computing device. The fingerprint reader and pressure sensor may be implemented under the screen and the touch screen is capable of capturing movements of the user's finger as well as the user's fingerprints when the user touches the screen. Some fixed points may be shown on the touch screen to indicate the locations where the tactile pattern and fingerprints may be captured.

Figure 13:
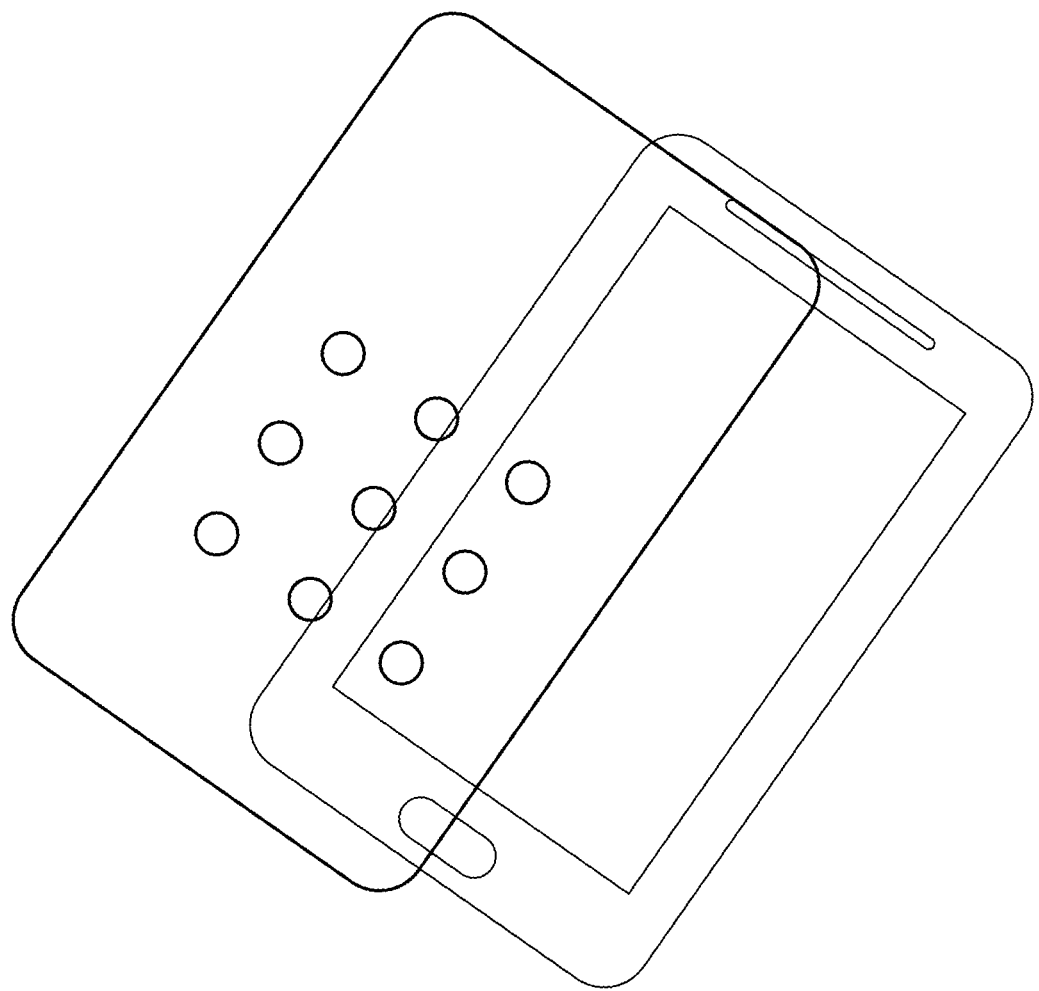
FIG. 13 illustrates a screen protector integrated with a fingerprint reader in accordance with an embodiment of the present invention.

FIG. 13 illustrates a screen protector integrated with a fingerprint reader in accordance with an embodiment of the present invention. In this example, a computing device comprises a touch screen that is capable of capturing movements of a user's finger on the screen. A screen protector that is integrated with a fingerprint reader may be placed on top of the touch screen. The screen protector may be connected to the computing device via a wire or wireless link. When a user is drawing a pattern on the screen protector, the pressure on the screen protector is conducted to the touch screen under the screen protector and thus captured by the touch screen. The user's fingerprints are captured by the fingerprint reader of the screen protector when the user touches the screen protector. The captured fingerprint data may be transmitted to the computing device through the wired or wireless link. In another embodiment, the screen protector may be integrated with a pressure sensor and a fingerprint reader and the user's tactile pattern and fingerprints may be captured by the screen protector and transmitted to a computing device.

Figure 14:
FIG. 14 illustrates a fingerprint reader integrated with a pressure sensor in accordance with an embodiment of the present invention.

FIG. 14 illustrates a fingerprint reader integrated with a pressure sensor in accordance with an embodiment of the present invention. In this example, a fingerprint reader is a standalone device that can be connected to a computing device through a cable, such as a Universal Serial Bus (USB) cable. The fingerprint reader comprises a touch pad that is capable of sensing the pressure of a user's finger on the pad. When a user moves his finger on the pad, the tactile pattern of the finger movements may be captured by the touch pad and one or more fingerprints may be captured when the user is drawing the pattern. The captured pattern and fingerprints may be transmitted to the computing device through the cable for user authentication.

Figure 15:
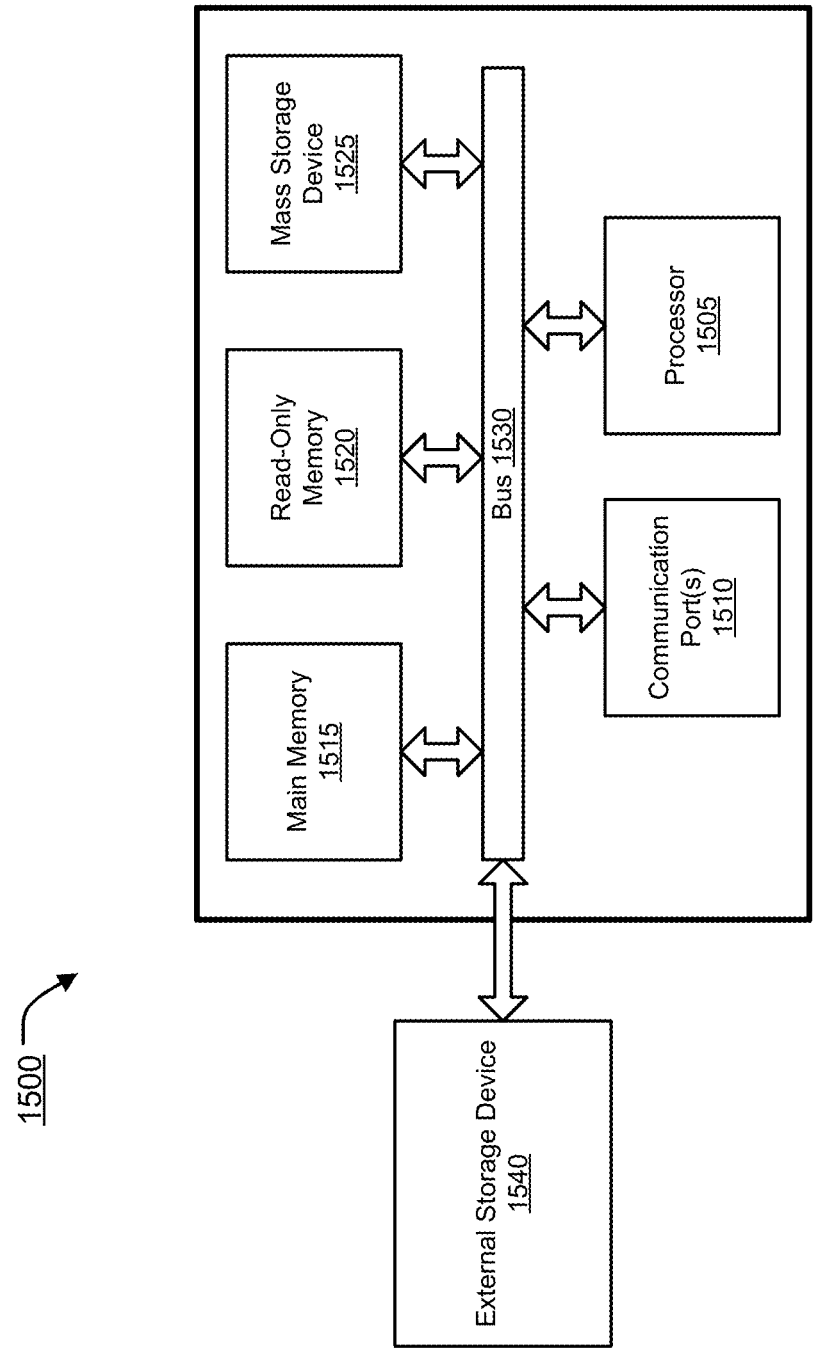
FIG. 15 is an exemplary computer system in which or with which embodiments of the present invention may be utilized.

FIG. 15 is an example of a computer system 1500 with which embodiments of the present disclosure may be utilized. Computer system 1500 may represent or form a part of a computing device (e.g., computing device 1100) having a touchscreen (not shown).

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1500 includes a bus 1530, a processor 1505, communication port 1510, a main memory 1515, a removable storage media 1540, a read only memory 1520 and a mass storage 1525. A person skilled in the art will appreciate that computer system 1500 may include more than one processor and communication ports.

Examples of processor 1505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1505 may include various modules associated with embodiments of the present invention.

Communication port 1510 can be any of an RS-232 port for use with a modem based dialup connection, a 10/100 Ethernet port, a Gigabit or 10 Gigabit port using copper or fiber, a serial port, a parallel port, or other existing or future ports. Communication port 1510 may be chosen depending on a network, such a Local Area Network (LAN), Wide Area Network (WAN), or any network to which computer system 1500 connects.

Memory 1515 can be Random Access Memory (RAM), or any other dynamic storage device commonly known in the art. Read only memory 1520 can be any static storage device(s) such as, but not limited to, a Programmable Read Only Memory (PROM) chips for storing static information such as start-up or BIOS instructions for processor 1505.

Mass storage 1525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1530 communicatively couples processor(s) 1505 with the other memory, storage and communication blocks. Bus 1530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1505 to system memory.

Optionally, operator and administrative interfaces, such as a display, keyboard, and a cursor control device, may also be coupled to bus 1530 to support direct operator interaction with computer system 1500. Other operator and administrative interfaces can be provided through network connections connected through communication port 1510.

Removable storage media 1540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    capturing, by a computing device, a tactile pattern that is drawn by a user's finger on a touch panel that is operationally connected to the computing device;
    capturing, by the computing device, a plurality of fingerprints of the user by a fingerprint reader of the computing device at one or more locations on the touch panel by periodically capturing one or more fingerprints of the plurality of fingerprints at a predefined interval while the user is drawing the tactile pattern;
    matching, by the computing device, the captured tactile pattern with a stored tactile pattern that was previously defined by the user;
    matching, by the computing device, one or more captured fingerprints of the plurality of captured fingerprints with one or more stored fingerprints of the user that were previously captured from the user concurrently with the stored tactile pattern, wherein each captured fingerprint of the one or more captured fingerprints is compared against the one or more stored fingerprints; and
    authenticating, by the computing device, the user when the captured tactile pattern matches the stored tactile pattern and when the matching of the one or more captured fingerprints with the one or more stored fingerprints satisfies a security rule that specifies a minimum quantity of the one or more captured fingerprints required to match the one or more stored fingerprints.

2. The method of claim 1, wherein the touch panel comprises of one or more fixed locations, and wherein the tactile pattern and the plurality of fingerprints are captured at the one or more fixed locations.

3. The method of claim 1, wherein the tactile pattern is drawn freely on the touch panel and the plurality of fingerprint are captured at one or more pre-defined points of the tactile pattern.

4. The method of claim 3, wherein the one or more pre-defined points of the tactile pattern comprise one or more of a start point, an end point and a turning point.

5. The method of claim 1, wherein the tactile pattern comprises one or more of a movement pattern and a rhythm pattern.

6. The method of claim 1, wherein fingerprints of different fingers of the user are captured.

7. The method of claim 1, wherein the touch panel and the fingerprint reader are integrated with a screen of the computing device.

8. The method of claim 1, wherein the fingerprint reader is integrated with a screen protector that is configured to be placed on top of an external surface of a screen of the computing device.

9. The method of claim 1, wherein the touch panel and the fingerprint reader are integrated together as a standalone device that is capable of connecting to the computing device through an interface of the computing device.

10. The method of claim 1, further comprising:
    recording, by the computing device, a plurality of locations where the plurality of fingerprints are captured, wherein each location of the plurality of locations corresponds to a fingerprint of the plurality of fingerprints;
    matching, by the computing device, one or more recorded locations of the plurality of recorded locations of fingerprints with one or more stored locations of fingerprints.

11. The method of claim 1, wherein said periodically capturing one or more fingerprints of the plurality of fingerprints at a predefined interval while the user is drawing the tactile pattern comprises periodically capturing a single fingerprint of the plurality of fingerprints at each occurrence of the predefined interval while the user is drawing the tactile pattern.

12. The method of claim 1, wherein each captured fingerprint represents a substantially oval-shaped fingerprint image.

13. The method of claim 12, wherein each substantially oval-shaped fingerprint image represents an entirety of a portion of a finger in contact with the touch panel.

14. A computing device comprising:
    a non-transitory storage device having embodied therein one or more routines representing a client security manager; and
    one or more processors coupled to the non-transitory storage device and operable to execute the client security manager to perform a method comprising:
    capturing a tactile pattern that is drawn by a user's finger on a touch panel that is operationally connected to the computing device;
    capturing a plurality of fingerprints of the user by a fingerprint reader of the computing device at one or more locations on the touch panel by periodically capturing one or more fingerprints of the plurality of fingerprints at a predefined interval while the user is drawing the tactile pattern;
    matching the captured tactile pattern with a stored tactile pattern that was previously defined by the user;
    matching one or more captured fingerprints of the plurality of captured fingerprints with one or more stored fingerprints of the user that were previously captured from the user concurrently with the stored tactile pattern, wherein each captured fingerprint of the one or more captured fingerprints is compared against the one or more stored fingerprints; and
    authenticating the user when the captured tactile pattern matches the stored tactile pattern and when the matching of the one or more captured fingerprints with the one or more stored fingerprints satisfies a security rule that specifies a minimum quantity of the one or more captured fingerprints required to match the one or more stored fingerprints.

15. The computing device of claim 14, wherein the touch panel comprises of one or more fixed locations, and wherein the tactile pattern and the plurality of fingerprints are captured at the one or more fixed locations.

16. The computing device of claim 14, wherein the tactile pattern is drawn freely on the touch panel and the plurality of fingerprints are captured at one or more pre-defined points of the tactile pattern.

17. The computing device of claim 16, wherein the one or more pre-defined points of the tactile pattern comprise one or more of a start point, an end point and a turning point.

18. The computing device of claim 14, wherein the tactile pattern comprises one or more of a movement pattern and a rhythm pattern.

19. The computing device of claim 14, wherein fingerprints of different fingers of the user are captured.

20. The computing device of claim 14, wherein the touch panel and the fingerprint reader are integrated with a screen of the computing device.

21. The computing device of claim 14, wherein the fingerprint reader is integrated with a screen protector that is configured to be placed on top of an external surface of a screen of the computing device.

22. The computing device of claim 14, wherein the touch panel and the fingerprint reader are integrated together as a standalone device that is capable of connecting to the computing device through an interface of the computing device.

23. The computing device of claim 14, wherein said periodically capturing one or more fingerprints of the plurality of fingerprints at a predefined interval while the user is drawing the tactile pattern comprises periodically capturing a single fingerprint of the plurality of fingerprints at each occurrence of the predefined interval while the user is drawing the tactile pattern.

24. The computing device of claim 14, wherein each captured fingerprint represents a substantially oval-shaped fingerprint image.

25. The computing device of claim 24, wherein each substantially oval-shaped fingerprint image represents an entirety of a portion of a finger in contact with the touch panel.

* * * * *